(12) United States Patent
Suto et al.

(10) Patent No.: US 11,004,464 B1
(45) Date of Patent: May 11, 2021

(54) MAGNETIC HEAD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hirofumi Suto, Tokyo (JP); Naoyuki Narita, Chiba (JP); Tazumi Nagasawa, Kanagawa (JP); Masayuki Takagishi, Tokyo (JP); Hitoshi Iwasaki, Tokyo (JP); Tomoyuki Maeda, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/015,281

(22) Filed: Sep. 9, 2020

(30) Foreign Application Priority Data

Mar. 17, 2020 (JP) .............................. JP2020-046053

(51) Int. Cl.
*G11B 5/127* (2006.01)
*G11B 5/012* (2006.01)
*G11B 5/11* (2006.01)

(52) U.S. Cl.
CPC ............ *G11B 5/1278* (2013.01); *G11B 5/012* (2013.01); *G11B 5/11* (2013.01)

(58) Field of Classification Search
CPC .......... G11B 5/1278; G11B 5/012; G11B 5/11
USPC .................. 360/125.1–125.7, 125.31–125.36
See application file for complete search history.

(56) References Cited

U.S. PATENT DOCUMENTS

| 2017/0186450 | A1* | 6/2017 | Yamada | G11B 5/3146 |
| 2019/0088275 | A1* | 3/2019 | Narita | G11B 5/3116 |
| 2020/0294537 | A1* | 9/2020 | Nagasawa | G11B 5/1278 |

FOREIGN PATENT DOCUMENTS

JP 2019-57338 A 4/2019

\* cited by examiner

*Primary Examiner* — Allen T Cao
(74) *Attorney, Agent, or Firm* — Finnegan, Henderson, Farabow, Garrett & Dunner L.L.P.

(57) ABSTRACT

According to one embodiment, a magnetic head includes first and second shields, a magnetic pole, a first magnetic layer, and a first nonmagnetic member. The first shield includes first, second, and third partial regions. A first direction is from the second toward third partial region. The first partial region is between the second and third partial regions. A second direction from the first toward second shield crosses the first direction. The magnetic pole between the second and third partial regions in the first direction is provided between the first partial region and the second shield in the second direction. The first magnetic layer is provided between the magnetic pole and the second shield. The first nonmagnetic member includes first and second portions. The first portion is between the magnetic pole and the first magnetic layer. The second portion is between the second partial region and the second shield.

20 Claims, 14 Drawing Sheets

MAGNETIC HEAD

CROSS-REFERENCE TO RELATED APPLICATIONS

This application is based upon and claims the benefit of priority from Japanese Patent Application No. 2020-046053, filed on Mar. 17, 2020; the entire contents of which are incorporated herein by reference.

FIELD

Embodiments of the invention generally relate to a magnetic head.

BACKGROUND

Information is recorded in a magnetic storage medium such as a HDD (Hard Disk Drive) or the like by using a magnetic head. It is desirable to increase the recording density of the magnetic head and the magnetic recording device.

DETAILED DESCRIPTION

Figure 1:
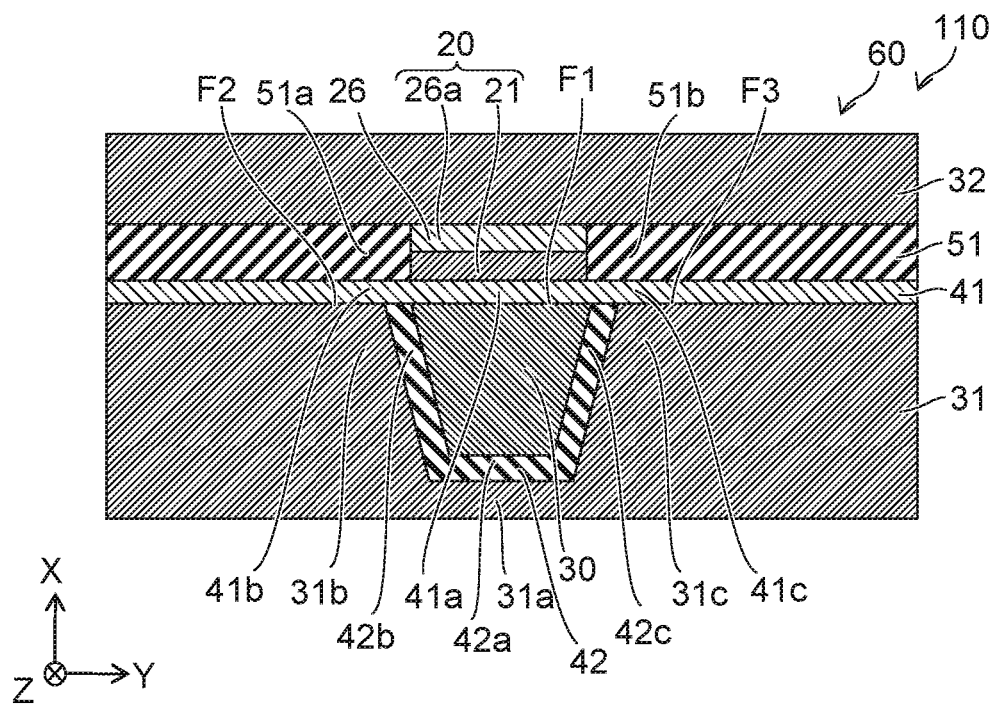
FIG. 1 is a schematic view illustrating a magnetic head according to a first embodiment.

According to one embodiment, a magnetic head includes a first shield, a second shield, a magnetic pole, a first magnetic layer, and a first nonmagnetic member. The first shield includes a first partial region, a second partial region, and a third partial region. A direction from the second partial region toward the third partial region is along a first direction. A position of the first partial region in the first direction is between a position of the second partial region in the first direction and a position of the third partial region in the first direction. A second direction from the first shield toward the second shield crosses the first direction. The magnetic pole is provided between the first partial region and the second shield in the second direction. The magnetic pole is between the second partial region and the third partial region in the first direction. The first magnetic layer is provided between the magnetic pole and the second shield. The first nonmagnetic member includes a first portion and a second portion. The first portion is between the magnetic pole and the first magnetic layer in the second direction. The second portion is between the second partial region and the second shield in the second direction. The second portion is electrically connected to the second partial region.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

Figure 2:
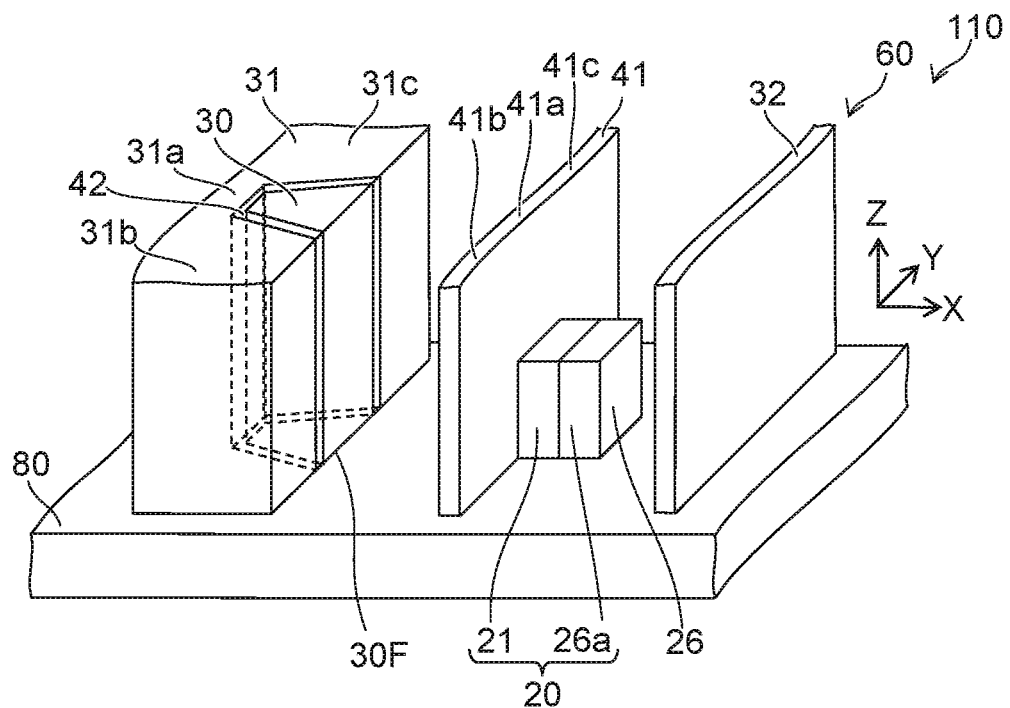
FIG. 2 is a schematic view illustrating the magnetic head according to the first embodiment.

FIGS. 1 and 2 are schematic views illustrating a magnetic head according to a first embodiment.

FIG. 1 is a plan view. FIG. 2 is a perspective view. For easier viewing of the drawing in FIG. 2, a portion of the components included in the magnetic head are not illustrated, and multiple components are shown as being separated from each other.

As shown in FIG. 2, the magnetic head 110 according to the embodiment includes a first shield 31, a second shield 32, a magnetic pole 30, a first magnetic layer 21, and a first nonmagnetic member 41. For example, the first shield 31, the second shield 32, the magnetic pole 30, the first magnetic layer 21, and the first nonmagnetic member 41 are included in a recording part 60.

As shown in FIG. 2, the magnetic head 110 is used with a magnetic recording medium 80. Information is recorded in the magnetic recording medium 80 by the recording part 60 of the magnetic head 110. The magnetic recording medium 80 is, for example, a perpendicular recording medium. Examples of the magnetic recording medium 80 are described below.

As shown in FIG. 2, the magnetic pole 30 includes a medium-facing surface 30F. The medium-facing surface 30F is, for example, an ABS (Air Bearing Surface). For example, the medium-facing surface 30F faces the magnetic recording medium 80.

FIG. 1 corresponds to a plan view of the magnetic head 110 facing the medium-facing surface 30F.

As shown in FIGS. 1 and 2, the first shield 31 includes a first partial region 31a, a second partial region 31b, and a third partial region 31c. The direction from the second partial region 31b toward the third partial region 31c is along a first direction.

The first direction is, for example, a Y-axis direction. One direction perpendicular to the Y-axis direction is taken as an X-axis direction. A direction perpendicular to the Y-axis direction and the X-axis direction is taken as a Z-axis direction.

The Y-axis direction is, for example, the cross-track direction. The X-axis direction is, for example, the down-track direction. The Z-axis direction is, for example, the height direction.

The position of the first partial region 31a in the first direction (the Y-axis direction) is between the position of the second partial region 31b in the first direction and the position of the third partial region 31c in the first direction.

A second direction from the first shield 31 toward the second shield 32 crosses the first direction. The second direction is, for example, the X-axis direction.

For example, at least a portion of the first shield 31 corresponds to a leading shield. For example, the second shield 32 corresponds to a trailing shield.

The magnetic pole 30 is provided between the first partial region 31a and the second shield 32 in the second direction (the X-axis direction). The magnetic pole 30 is between the second partial region 31b and the third partial region 31c in the first direction (the Y-axis direction). For example, the second partial region 31b and the third partial region 31c correspond to side shields.

The first magnetic layer 21 is provided between the magnetic pole 30 and the second shield 32. In the example, the recording part 60 of the magnetic head 110 includes a first nonmagnetic layer 26. The first nonmagnetic layer 26 includes a first nonmagnetic region 26a. The first nonmagnetic region 26a is between the first magnetic layer 21 and the second shield 32 in the second direction (e.g., the X-axis direction).

The first nonmagnetic layer 26 includes, for example, at least one selected from the group consisting of Cu, Ag, Au, Al, Cr, and Ru. The first magnetic layer 21 and the first nonmagnetic region 26a are included in a stacked body 20.

The first nonmagnetic member 41 includes a first portion 41a and a second portion 41b. In the example, the first nonmagnetic member 41 includes a third portion 41c. The first portion 41a is between the magnetic pole 30 and the first magnetic layer 21 in the second direction (e.g., the X-axis direction). The second portion 41b is between the second partial region 31b and the second shield 32 in the second direction (e.g., the X-axis direction). The second portion 41b is electrically connected to the second partial region 31b. For example, the second partial region 31b contacts the second portion 41b.

The third portion 41c of the first nonmagnetic member 41 is between the third partial region 31c and the second shield 32 in the second direction (e.g., the X-axis direction). The third portion 41c is electrically connected to the third partial region 31c. For example, the third partial region 31c contacts the third portion 41c.

In the embodiment, the first nonmagnetic member 41 includes, for example, at least one selected from the group consisting of Cr, Ru, Ta, Pt, Mn, Ir, and W.

The first magnetic layer 21 includes the following first element. The first element includes at least one selected from the group consisting of Fe, Co, and Ni. The first magnetic layer 21 may further include a second element. The second element includes at least one selected from the group consisting of B, Cr, N, and Si.

For example, as described below, a coil is provided at the vicinity of the magnetic pole 30. A recording current that corresponds to recorded information is supplied to the coil. A magnetic field (a recording magnetic field) that corresponds to the recording current is generated from the magnetic pole 30. The recording magnetic field passes through the magnetic recording medium 80 and enters the second shield 32. The information is recorded by the magnetization of the magnetic recording medium 80 being controlled by the recording magnetic field entering the magnetic recording medium 80.

Another portion of the recording magnetic field generated from the magnetic pole 30 passes through the first magnetic layer 21 and enters the second shield 32 without being oriented toward the magnetic recording medium 80.

In the embodiment, for example, a current is supplied to the stacked body 20 along the X-axis direction. For example, the orientation of the current supplied to the stacked body 20 has an orientation from the first nonmagnetic layer 26 toward the first magnetic layer 21. The current causes the orientation of the magnetization of the first magnetic layer 21 to be the reverse of the orientation of the magnetization of the magnetic pole 30. Thereby, the other portion of the recording magnetic field generated from the magnetic pole 30 does not easily enter the first magnetic layer 21. Therefore, the recording magnetic field that is generated from the magnetic pole 30 is easily oriented toward the magnetic recording medium 80. The recording magnetic field is efficiently applied to the magnetic recording medium 80. This effect due to the first magnetic layer 21 becomes more pronounced as the distance (the recording gap) between the magnetic pole 30 and the second shield 32 is reduced. By providing the first magnetic layer 21, good recording can be performed even when the distance between the magnetic pole 30 and the second shield 32 is short.

In the embodiment, the second portion 41b of the first nonmagnetic member 41 is between the second shield 32 and the second partial region 31b of the first shield 31. The heat that is generated by the current supplied to the first magnetic layer 21 is transferred to the second partial region 31b via the second portion 41b. Efficient heat dissipation is performed. Similarly, the heat is transferred to the third partial region 31c via the third portion 41c. Efficient heat dissipation is performed. Stable recording characteristics can be maintained even when the recording gap is small. According to the embodiment, a magnetic head and a magnetic recording device can be provided in which the recording density can be increased. For example, high reliability is obtained by efficient heat dissipation.

For example, there is a reference example in which the size of the first nonmagnetic member 41 is equal to the size of the first magnetic layer 21. When patterning the first magnetic layer 21 in the reference example, the first nonmagnetic member 41 also is patterned, and there is a possibility that a portion of the first shield 31, which is the foundation of the first nonmagnetic member 41, may be removed. For example, the second and third partial regions 31b and 31c of the first shield 31 recede more easily than the surface of the magnetic pole 30 corresponding to the first nonmagnetic member 41. The side shield function degrades when the second partial region 31b and the third partial region 31c recede.

Conversely, at the vicinity of the magnetic pole 30 in the embodiment, the second partial region 31b is covered with the second portion 41b, and the third partial region 31c is covered with the third portion 41c. The amount that the second partial region 31b and the third partial region 31c recede can be suppressed thereby. A good side shield function of the second and third partial regions 31b and 31c can be maintained. Thereby, the recording magnetic field can be effectively applied to the magnetic recording medium 80. The recording density can be further increased thereby.

As shown in FIG. 1, the magnetic pole 30 includes a first surface F1. The first surface F1 faces the first portion 41a. The second partial region 31b includes a second surface F2. The second surface F2 faces the second portion 41b. The direction from the second surface F2 toward the first surface F1 is along the first direction (the Y-axis direction). For example, the position in the second direction (the X-axis direction) of the second surface F2 is substantially the same as the position in the second direction of the first surface F1. For example, the second surface F2 is substantially included in a surface (e.g., a plane) including the first surface F1. A high side shield effect is obtained by such a second surface F2.

The third partial region 31c includes a third surface F3. The third surface F3 faces the third portion 41c. The direction from the first surface F1 toward the third surface F3 is along the first direction (the Y-axis direction). For example, the position in the second direction (the X-axis direction) of the third surface F3 is substantially the same as the position in the second direction of the first surface F1. For example, the third surface F3 is substantially included in the surface (e.g., the plane) including the first surface F1. A high side shield effect is obtained by such a third surface F3.

As shown in FIG. 1, the recording part 60 of the magnetic head 110 includes a first insulating member 51. The first insulating member 51 includes a first insulating region 51a and a second insulating region 51b. The first insulating region 51a is between the second portion 41b and the second shield 32 in the second direction (e.g., the X-axis direction). The second insulating region 51b is between the third portion 41c and the second shield 32 in the second direction. The first magnetic layer 21 is between the first insulating region 51a and the second insulating region 51b in the first direction (the Y-axis direction). The first insulating member 51 electrically insulates between the first shield 31 and the second shield 32.

The first insulating member 51 includes, for example, at least one selected from the group consisting of silicon oxide, silicon nitride, and aluminum oxide. Good insulation properties are obtained.

As shown in FIG. 1, the recording part 60 of the magnetic head 110 includes a second nonmagnetic member 42. The second nonmagnetic member 42 includes a first nonmagnetic portion 42a, a second nonmagnetic portion 42b, and a third nonmagnetic portion 42c. The first nonmagnetic portion 42a is between the first partial region 31a and the magnetic pole 30 in the second direction (e.g., the X-axis direction). The second nonmagnetic portion 42b is between the second partial region 31b and the magnetic pole 30 in the first direction (the Y-axis direction). The third nonmagnetic portion 42c is between the magnetic pole 30 and the third partial region 31c in the first direction. For example, the second nonmagnetic member 42 also has good insulation properties. For example, the second nonmagnetic member 42 includes at least one selected from the group consisting of silicon oxide, silicon nitride, and aluminum oxide.

Figure 3:
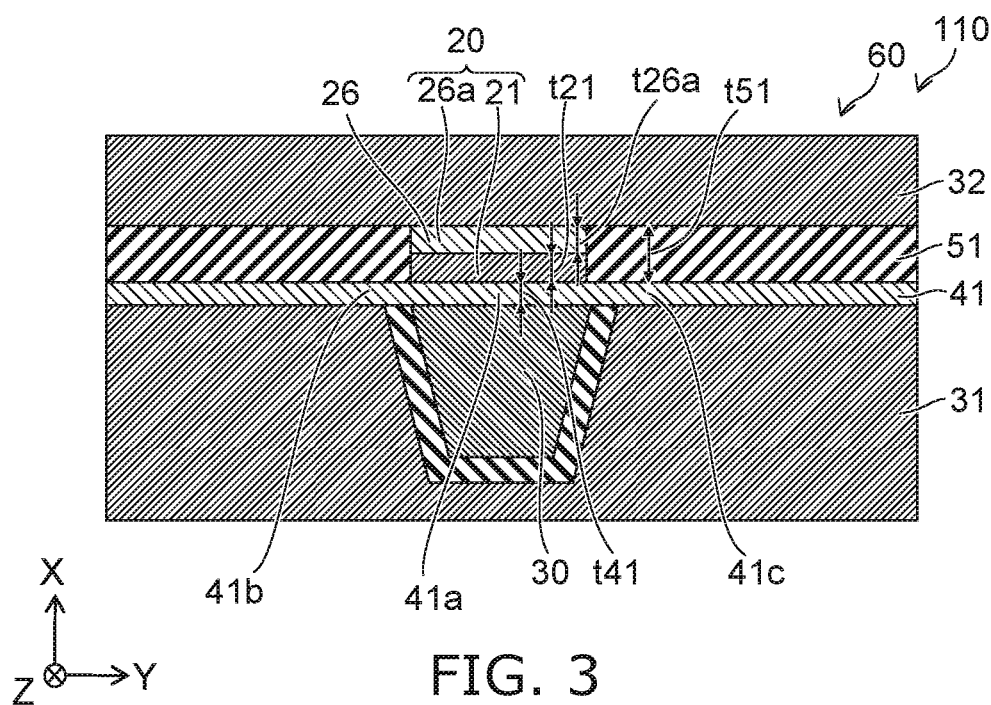
FIG. 3 is a schematic plan view illustrating the magnetic head according to the first embodiment.

FIG. 3 is a schematic plan view illustrating the magnetic head according to the first embodiment.

As shown in FIG. 3, the first magnetic layer 21 has a thickness t21. The first nonmagnetic region 26a has a thickness t26a. The first nonmagnetic member 41 has a thickness t41. The first insulating member 51 has a thickness t51. These thicknesses are lengths along the second direction (the X-axis direction).

In the embodiment, the thickness t21 is, for example, not less than 2 nm and not more than 30 nm. For example, by setting the thickness t21 to be 2 nm or more, the enhancement effect of the recording magnetic field is easier to obtain. For example, by setting the thickness t21 to be 30 nm or less, the decrease of the recording magnetic field due to the recording gap being too wide can be suppressed.

The thickness t26a is, for example, not less than 0.5 nm and not more than 10 nm. For example, by setting the thickness t26a to be 1 nm or more, the magnetic coupling can be broken. For example, by setting the thickness t26a to be 30 nm or less, the decrease of the recording magnetic field due to the recording gap being too wide can be suppressed.

The thickness t41 is, for example, not less than 0.5 nm and not more than 10 nm. For example, by setting the thickness t41 to be 0.5 nm or more, the spin transport can be suppressed. By setting the thickness t41 to be 10 nm or less, for example, the decrease of the recording magnetic field due to the recording gap being too wide can be suppressed.

The thickness t51 is, for example, not less than 10 nm and not more than 30 nm. For example, by setting the thickness t51 to be 10 nm or more, the decrease of the recording magnetic field due to the recording gap being too narrow can be suppressed. For example, by setting the thickness t51 to be 30 nm or less, the decrease of the recording magnetic field due to the recording gap being too wide can be suppressed.

Figure 4:
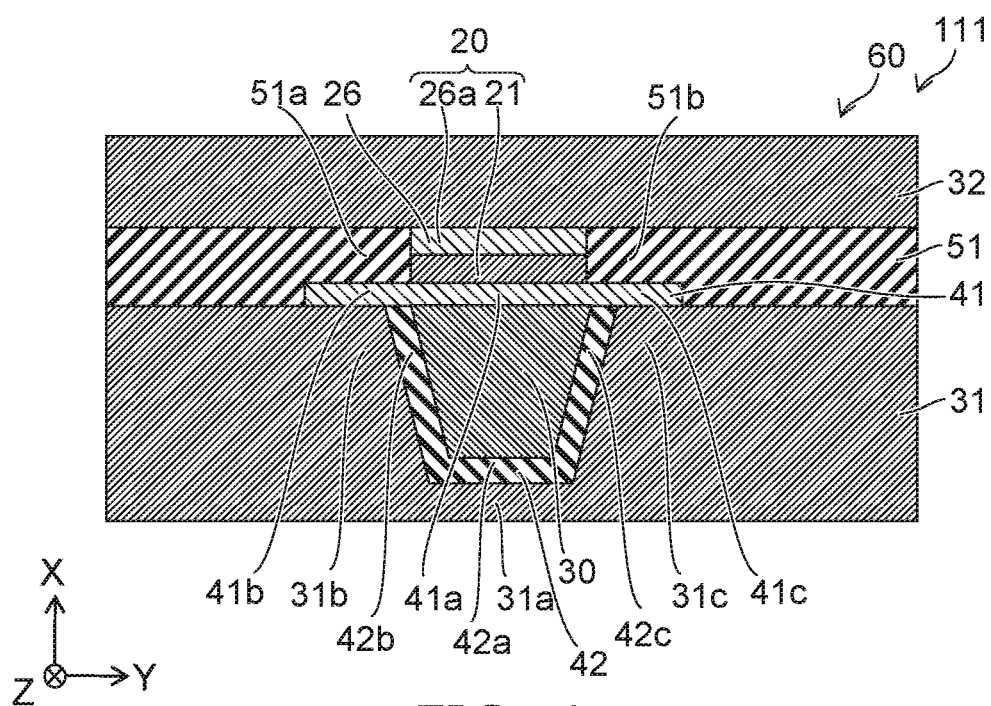
FIG. 4 is a schematic plan view illustrating a magnetic head according to the first embodiment.

FIG. 4 is a schematic plan view illustrating a magnetic head according to the first embodiment.

In the magnetic head 111 according to the embodiment as shown in FIG. 4, the second portion 41b is provided between the second shield 32 and a portion of the second partial region 31b. The third portion 41c is provided between the second shield 32 and a portion of the third partial region 31c. For example, the second portion 41b is between the second shield 32 and the end of the second partial region 31b at the magnetic pole 30 side. The third portion 41c is between the second shield 32 and the end of the third partial region 31c at the magnetic pole 30 side. The effect of the side shield is realized in a region proximate to the magnetic pole 30. In the magnetic head 111 as well, a good side shield effect is obtained.

Figure 5:
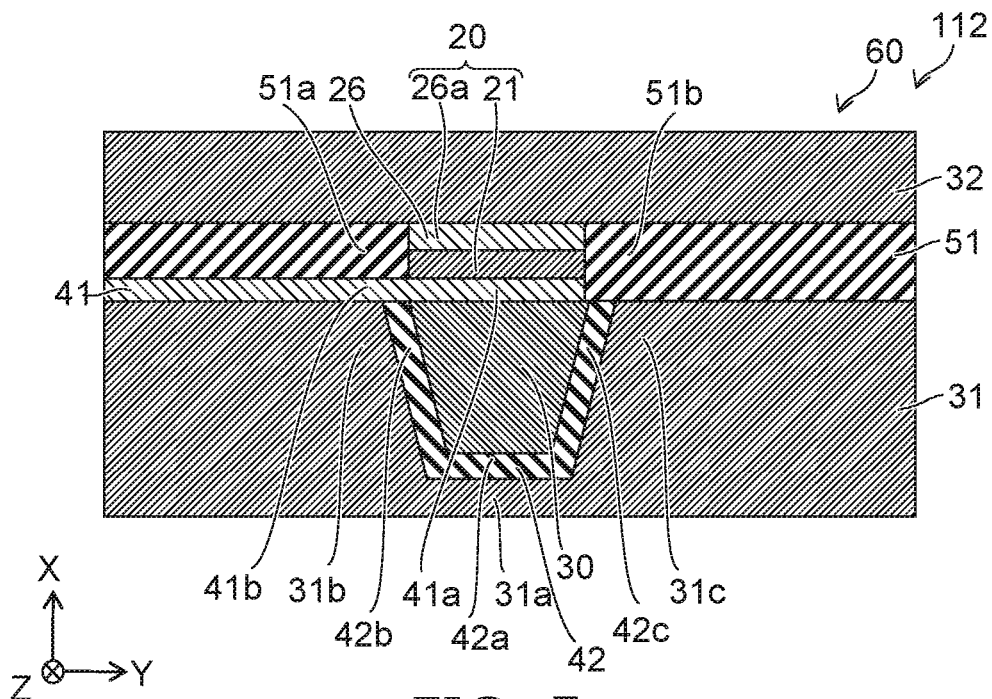
FIG. 5 is a schematic plan view illustrating a magnetic head according to the first embodiment.

FIG. 5 is a schematic plan view illustrating a magnetic head according to the first embodiment.

In the magnetic head 112 according to the embodiment as shown in FIG. 5, the second portion 41b is provided, and the third portion 41c is omitted. In the magnetic head 112 as well, efficient heat dissipation is obtained via the second portion 41b.

Figure 6:
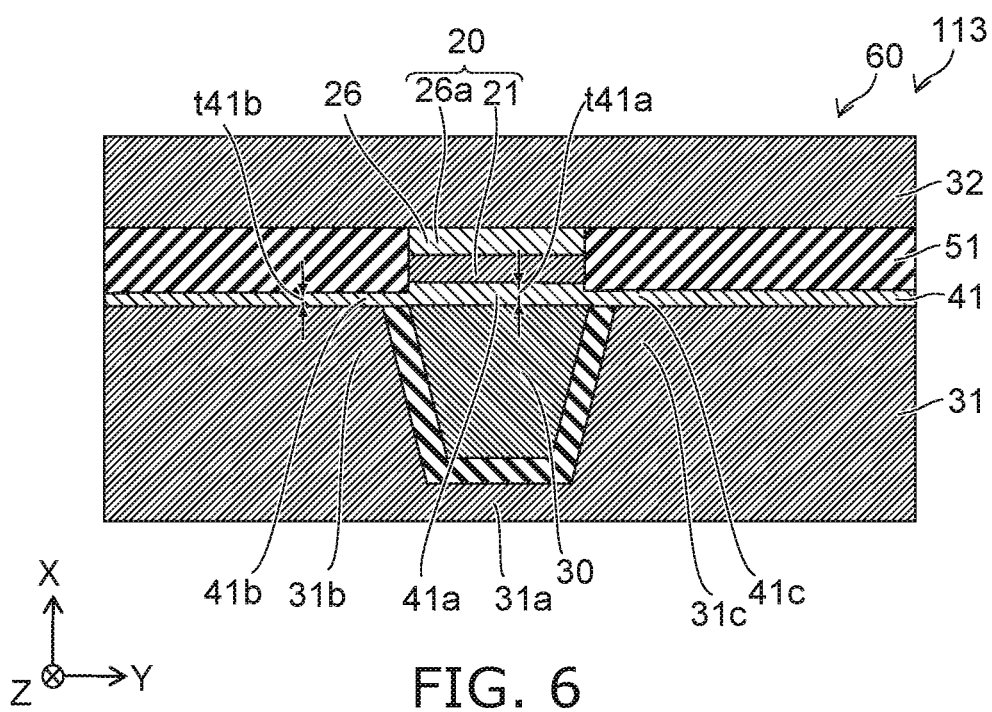
FIG. 6 is a schematic plan view illustrating a magnetic head according to the first embodiment.

FIG. 6 is a schematic plan view illustrating a magnetic head according to the first embodiment.

In the magnetic head 113 according to the embodiment as shown in FIG. 6, the thickness of the first nonmagnetic member 41 is different by location. In the magnetic head 113, a thickness t41a along the second direction (the X-axis direction) of the first portion 41a is greater than a thickness t41b along the second direction of the second portion 41b. In such a magnetic head 113 as well, efficient heat dissipation is obtained. A good side shield effect is obtained.

Figure 7:
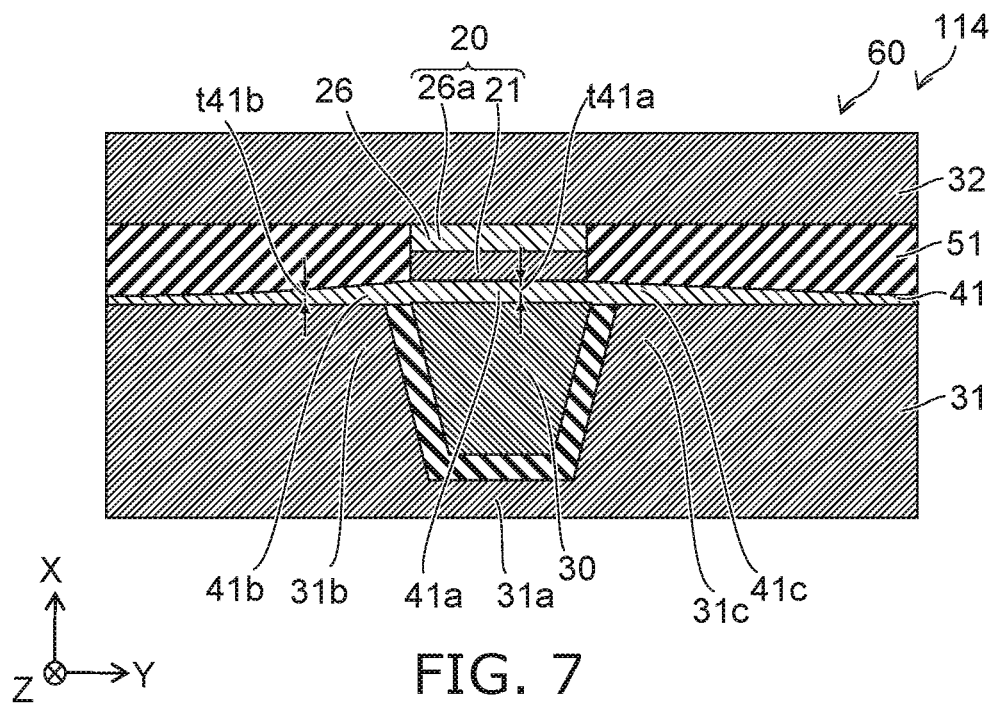
FIG. 7 is a schematic plan view illustrating a magnetic head according to the first embodiment.

FIG. 7 is a schematic plan view illustrating a magnetic head according to the first embodiment.

In the magnetic head 114 according to the embodiment as shown in FIG. 7, the thickness t41b along the second direction (e.g., the X-axis direction) of at least a portion of the second portion 41b decreases as the distance from the first portion 41a increases. For example, the thickness t41b decreases away from the first portion 41a. In such a magnetic head 114 as well, efficient heat dissipation is obtained. A good side shield effect is obtained.

Figure 8:
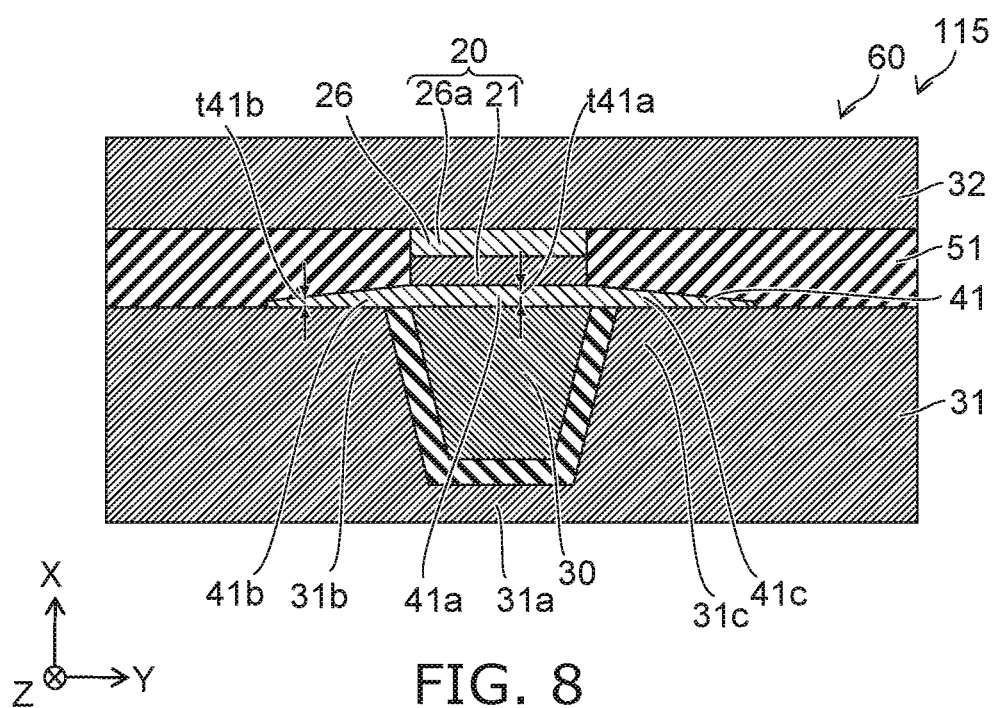
FIG. 8 is a schematic plan view illustrating a magnetic head according to the first embodiment.

FIG. 8 is a schematic plan view illustrating a magnetic head according to the first embodiment.

In the magnetic head 115 according to the embodiment as shown in FIG. 8, the second portion 41b is provided between the second shield 32 and a portion of the second partial region 31b. The thickness t41b decreases as the distance from the first portion 41a increases. In such a magnetic head 115 as well, efficient heat dissipation is obtained. A good side shield effect is obtained.

Figure 9:
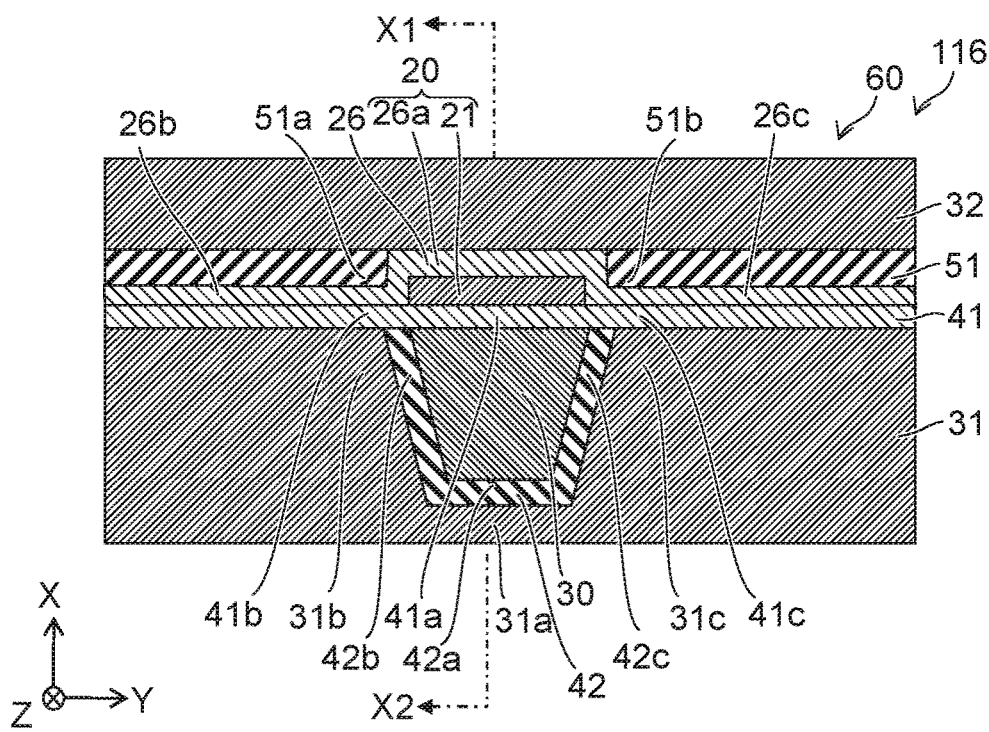
FIG. 9 is a schematic view illustrating a magnetic head according to the first embodiment.
Figure 10:
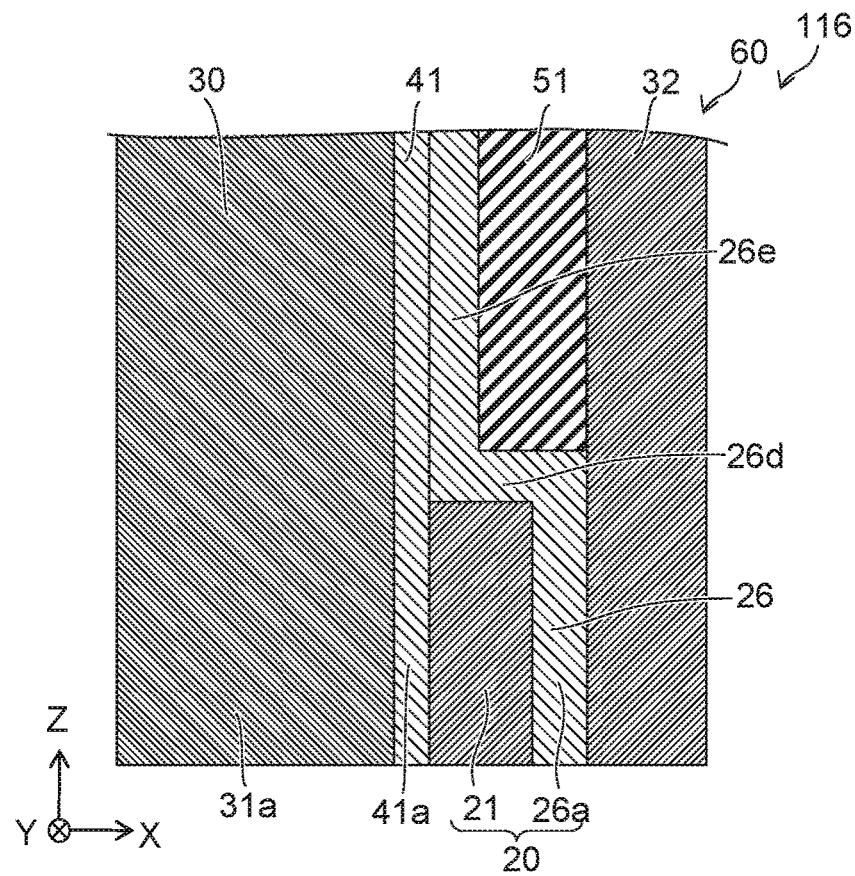
FIG. 10 is a schematic view illustrating the magnetic head according to the first embodiment.

FIGS. 9 and 10 are schematic views illustrating a magnetic head according to the first embodiment.

FIG. 9 is a plan view. FIG. 10 is a line X1-X2 cross-sectional view of FIG. 9.

In the magnetic head 116 according to the embodiment as shown in FIG. 9, the first nonmagnetic layer 26 includes a second nonmagnetic region 26b and a third nonmagnetic region 26c. For example, the second nonmagnetic region 26b and the third nonmagnetic region 26c are continuous with the first nonmagnetic region 26a. The first magnetic layer 21 is between the second nonmagnetic region 26b and the third nonmagnetic region 26c in the first direction (the Y-axis direction). In the magnetic head 116, spin is injected from the second nonmagnetic region 26b into the side surface of the first magnetic layer 21. Spin is injected from the third nonmagnetic region 26c into the side surface of the first magnetic layer 21. The reversal of the magnetization of the first magnetic layer 21 is efficiently performed thereby. For example, the voltage for supplying the current to the first magnetic layer 21 can be reduced.

As shown in FIG. 10, the first nonmagnetic layer 26 may include a fourth nonmagnetic region 26d. For example, the fourth nonmagnetic region 26d is continuous with the first nonmagnetic region 26a. A third direction from the first magnetic layer 21 toward the fourth nonmagnetic region 26d crosses a plane including the first and second directions. The third direction is, for example, the Z-axis direction. Spin is injected from the fourth nonmagnetic region 26d into the side surface of the first magnetic layer 21. The reversal of the magnetization of the first magnetic layer 21 is efficiently performed. For example, the voltage for supplying the current to the first magnetic layer 21 can be reduced.

As shown in FIG. 10, the first nonmagnetic layer 26 may include a fifth nonmagnetic region 26e. The direction from a portion of the first nonmagnetic member 41 toward the fifth nonmagnetic region 26e is along the X-axis direction. Such a fifth nonmagnetic region 26e may be provided.

In the magnetic heads 111 to 116 as well, a magnetic head and a magnetic recording device can be provided in which the recording density can be increased.

Second Embodiment

Other than the portions described below, the configuration described in reference to the first embodiment is applicable to the second embodiment.

Figure 11:
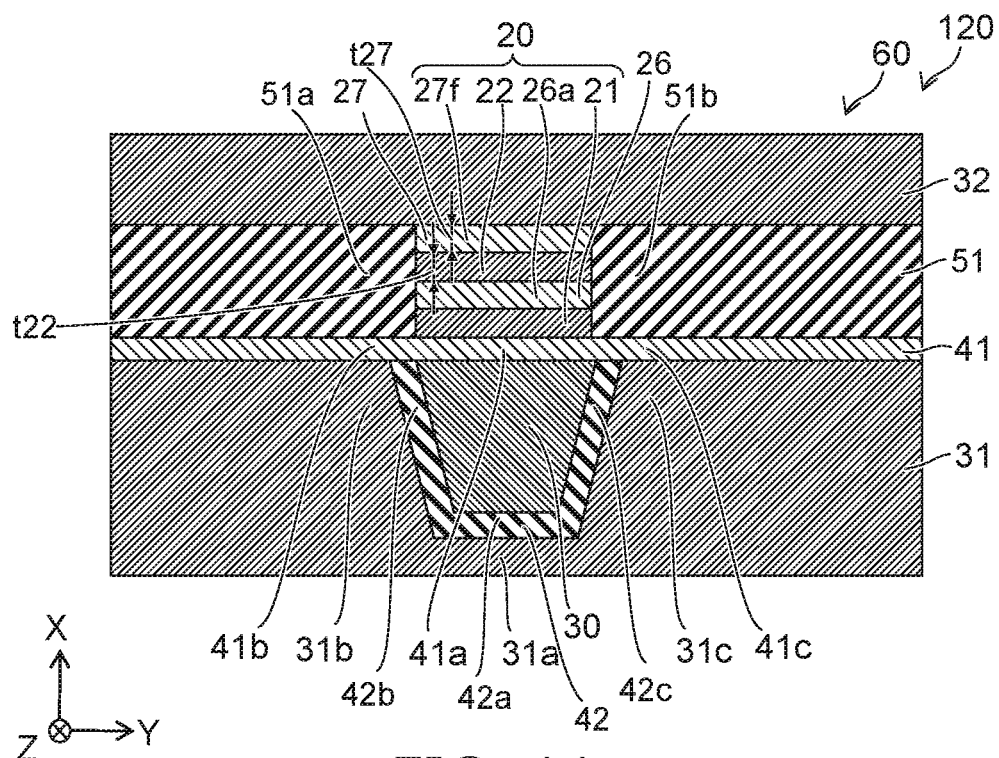
FIG. 11 is a schematic view illustrating a magnetic head according to the second embodiment.
Figure 12:
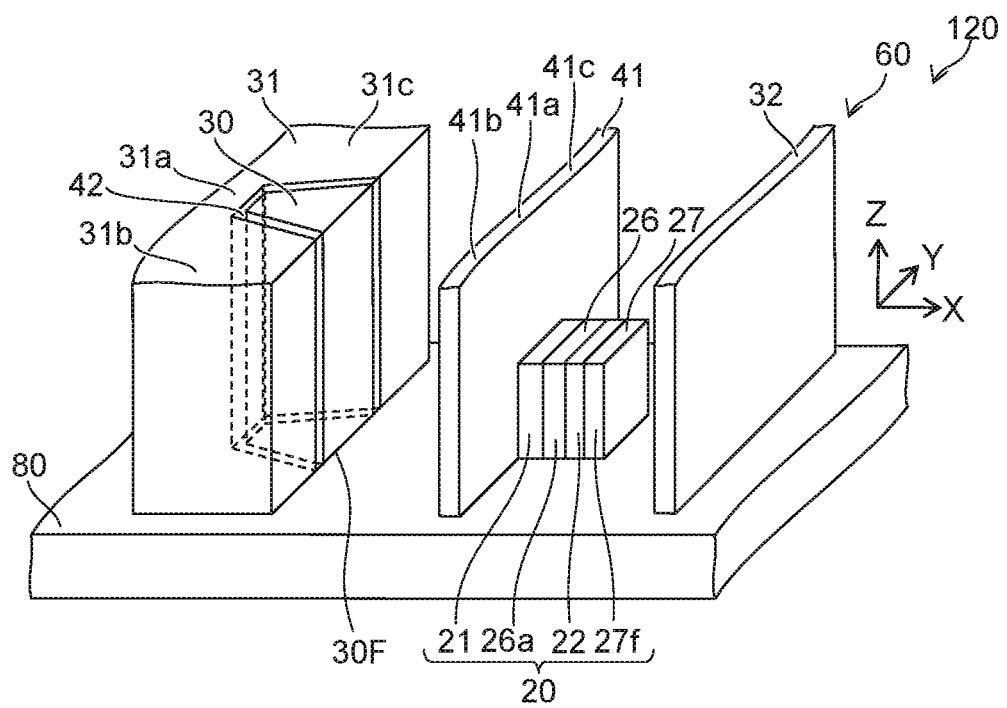
FIG. 12 is a schematic view illustrating the magnetic head according to the second embodiment.

FIGS. 11 and 12 are schematic views illustrating a magnetic head according to the second embodiment.

FIG. 11 is a plan view. FIG. 12 is a perspective view. For easier viewing of the drawing in FIG. 12, a portion of the components included in the magnetic head are not illustrated, and the multiple components are shown as being separated from each other.

The magnetic head 120 according to the embodiment as shown in FIG. 12 includes the first shield 31, the second shield 32, the magnetic pole 30, the first magnetic layer 21, and the first nonmagnetic member 41. The magnetic head 120 further includes a second magnetic layer 22, the first nonmagnetic layer 26, and a second nonmagnetic layer 27.

The first nonmagnetic layer 26 includes the first nonmagnetic region 26a. The first nonmagnetic region 26a is between the first magnetic layer 21 and the second shield 32 in the second direction (the X-axis direction). The second magnetic layer 22 is between the first nonmagnetic region 26a and the second shield 32 in the second direction. The second nonmagnetic layer 27 includes a sixth nonmagnetic region 27f. The sixth nonmagnetic region 27f is between the second magnetic layer 22 and the second shield 32 in the second direction.

For example, the first magnetic layer 21, the first nonmagnetic region 26a, the second magnetic layer 22, and the sixth nonmagnetic region 27f are included in the stacked body 20.

When a current is supplied to the stacked body 20, an alternating current magnetic field (e.g., a high frequency magnetic field) is generated from the stacked body 20. When the alternating current magnetic field is applied to the magnetic recording medium 80, the orientation of the magnetization of the magnetic recording medium 80 easily changes locally. Thereby, information is easily recorded in the magnetic recording medium 80 by the recording magnetic field generated from the magnetic pole 30. For example, MAMR (Microwave Assisted Magnetic Recording) can be performed.

In the magnetic head 120 as well, the heat that is generated by the current supplied to the stacked body 20 is transferred to the second partial region 31b via the second portion 41b. Efficient heat dissipation is performed. Similarly, the heat is transferred to the third partial region 31c via the third portion 41c. Efficient heat dissipation is performed. A magnetic head and a magnetic recording device can be provided in which the recording density can be increased. For example, high reliability is obtained by efficient heat dissipation.

In the magnetic head 120 as well, at the vicinity of the magnetic pole 30 in the embodiment, the second partial region 31b is covered with the second portion 41b, and the third partial region 31c is covered with the third portion 41c. The amount that the second and third partial regions 31b and 31c recede can be suppressed thereby. A good side shield function can be maintained. Thereby, the recording magnetic field can be effectively applied to the magnetic recording medium 80. The recording density can be further increased thereby.

In the magnetic head 120, the second magnetic layer 22 includes, for example, a third element. The third element includes at least one selected from the group consisting of Fe, Co, and Ni. The second magnetic layer 22 may further include a fourth element. The fourth element includes at least one selected from the group consisting of B, Cr, N, and Si.

The first nonmagnetic layer 26 includes, for example, at least one selected from the group consisting of Cu, Ag, Au, Al, Cr, and Ru. The second nonmagnetic layer 27 includes at least one selected from the group consisting of Cu, Ag, Au, Al, Cr, Ru, Ta, Pt, Mn, Ir, and W.

As shown in FIG. 11, the second magnetic layer 22 has a thickness t22. The second nonmagnetic layer 27 has a thickness t27. These thicknesses are lengths along the second direction (the X-axis direction).

In the embodiment, the thickness t22 is, for example, not less than 2 nm and not more than 30 nm. By setting the thickness t22 to be 2 nm or more, for example, the MAMR effect is easier to obtain. By setting the thickness t22 to be 30 nm or less, for example, the decrease of the recording magnetic field due to the recording gap being too wide can be suppressed.

The thickness t27 is, for example, not less than 0.5 nm and not more than 10 nm. For example, by setting the thickness t27 to be 0.5 nm or more, the magnetic coupling can be broken. For example, by setting the thickness t27 to be 0.5 nm or more, the spin transport can be suppressed. For example, by setting the thickness t27 to be 10 nm or less, the decrease of the recording magnetic field due to the recording gap being too wide can be suppressed.

Figure 13:
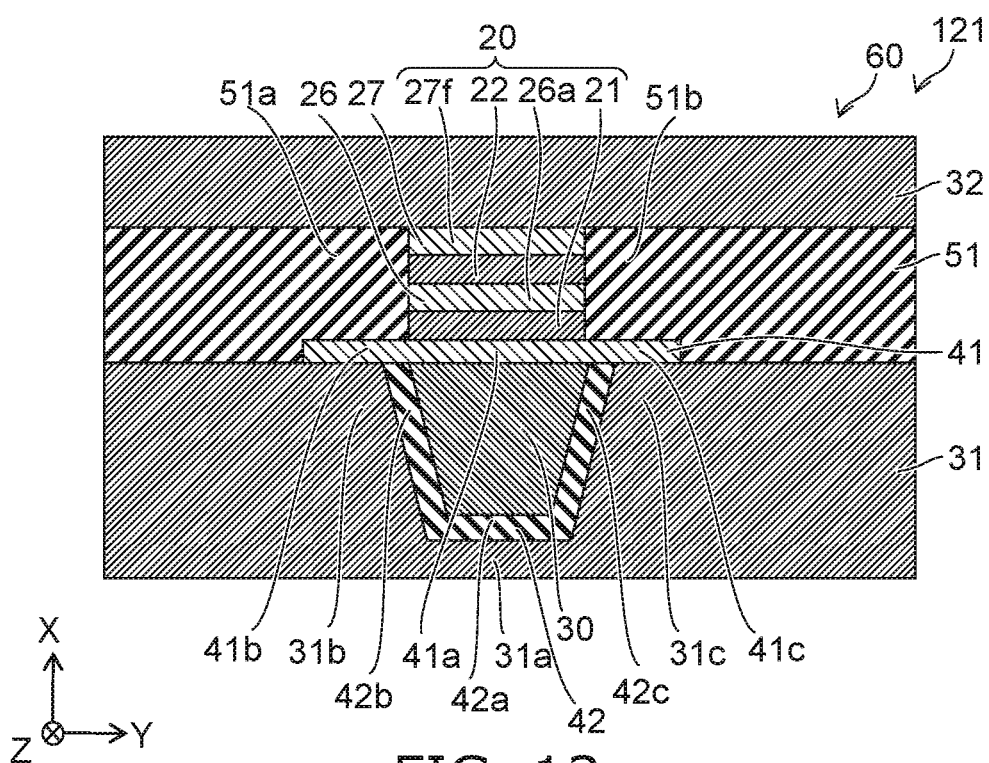
FIG. 13 is a schematic plan view illustrating a magnetic head according to the second embodiment.

FIG. 13 is a schematic plan view illustrating a magnetic head according to the second embodiment.

In the magnetic head 121 according to the embodiment as shown in FIG. 13, the second portion 41b is provided between the second shield 32 and a portion of the second partial region 31b. The third portion 41c is provided between the second shield 32 and a portion of the third partial region 31c. For example, the second portion 41b is between the second shield 32 and the end of the second partial region 31b at the magnetic pole 30 side. The third portion 41c is between the second shield 32 and the end of the third partial region 31c at the magnetic pole 30 side. In the magnetic head 121 as well, a good side shield effect is obtained.

Figure 14:
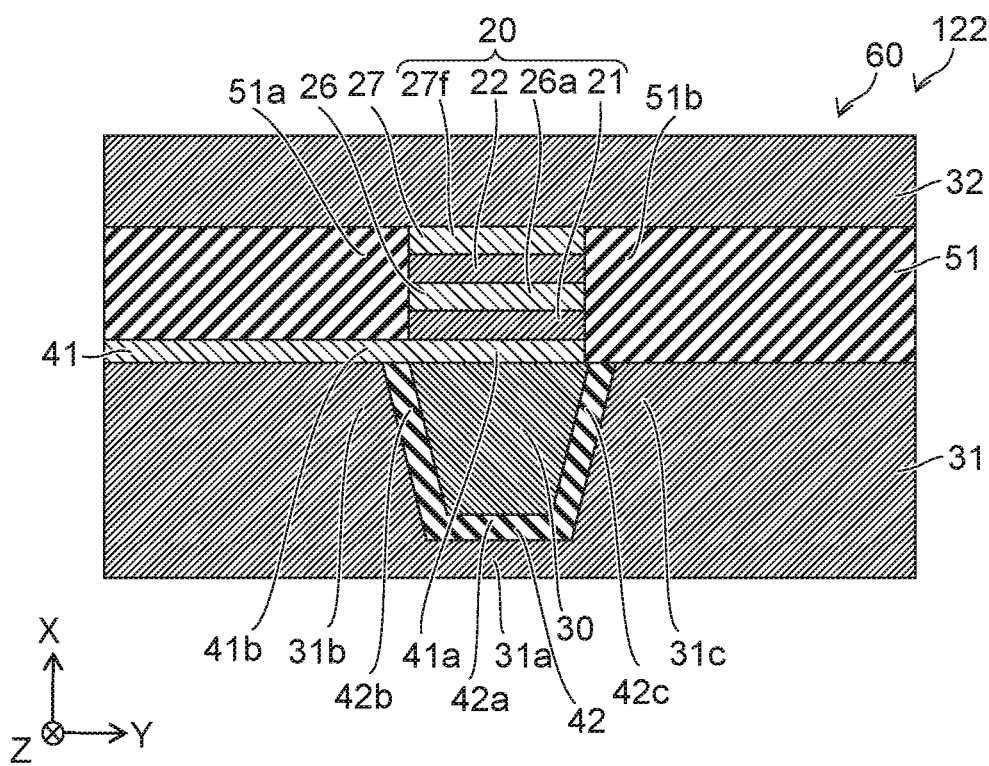
FIG. 14 is a schematic plan view illustrating a magnetic head according to the second embodiment.

FIG. 14 is a schematic plan view illustrating a magnetic head according to the second embodiment.

In the magnetic head 122 according to the embodiment as shown in FIG. 14, the second portion 41b is provided, and the third portion 41c is omitted. In the magnetic head 122 as well, efficient heat dissipation is obtained via the second portion 41b.

Figure 15:
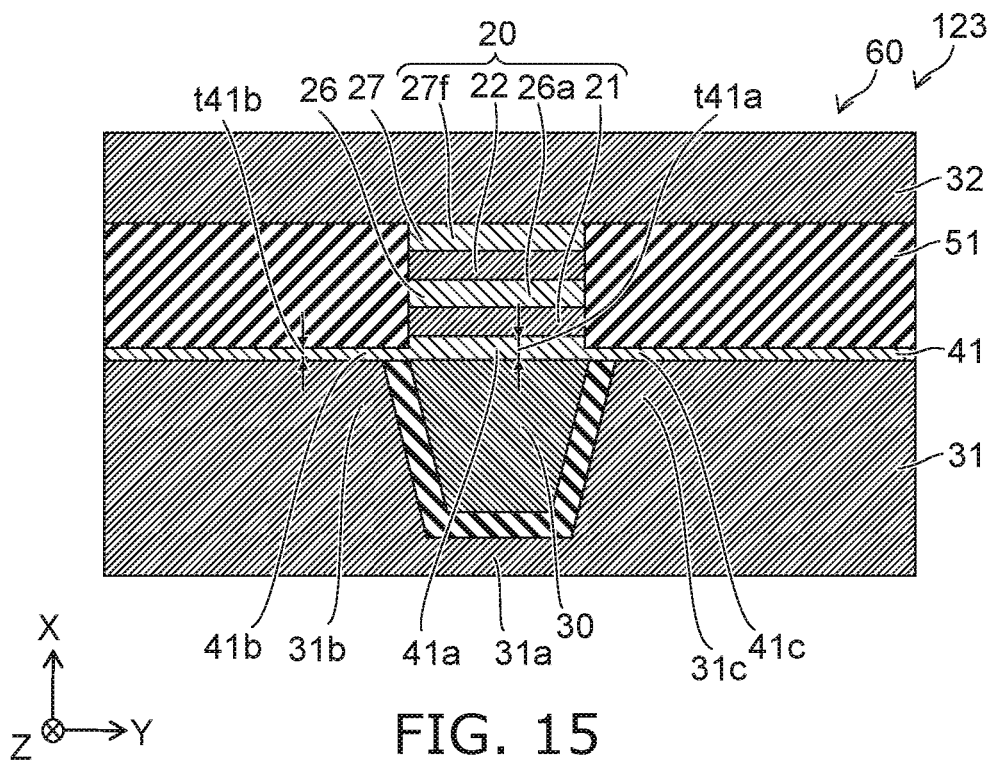
FIG. 15 is a schematic plan view illustrating a magnetic head according to the second embodiment.

FIG. 15 is a schematic plan view illustrating a magnetic head according to the second embodiment.

In the magnetic head 123 according to the embodiment as shown in FIG. 15, the thickness t41a along the second direction (the X-axis direction) of the first portion 41a is greater than the thickness t41b along the second direction of the second portion 41b. In the magnetic head 123 as well, efficient heat dissipation is obtained. A good side shield effect is obtained.

Figure 16:
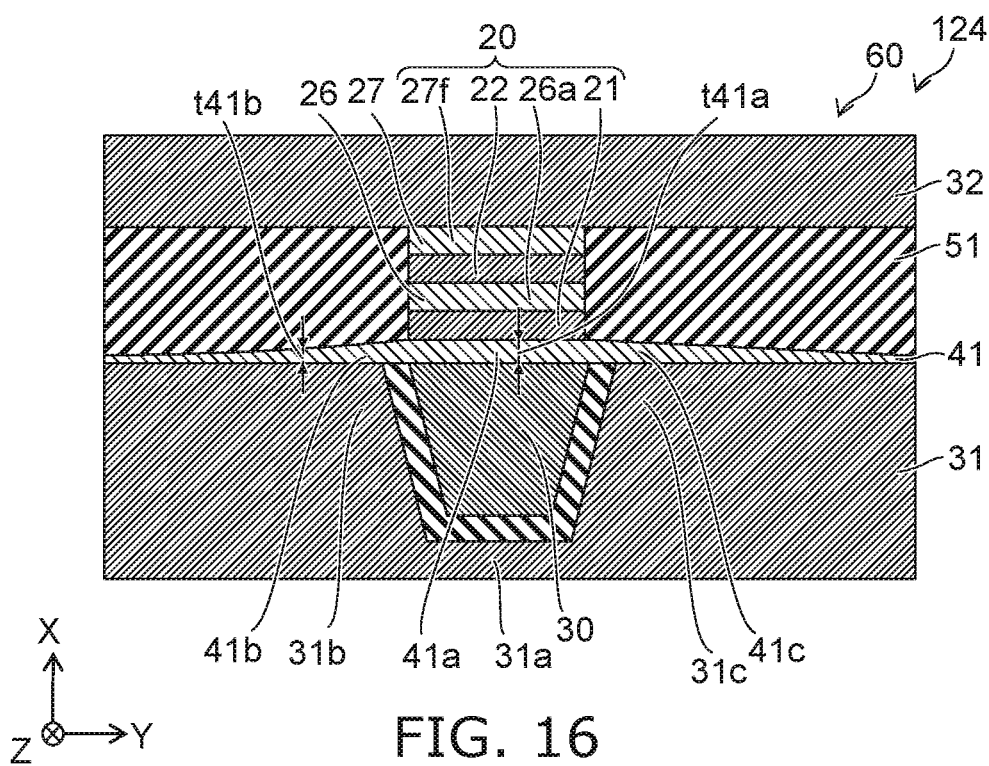
FIG. 16 is a schematic plan view illustrating a magnetic head according to the second embodiment.

FIG. 16 is a schematic plan view illustrating a magnetic head according to the second embodiment.

In the magnetic head 124 according to the embodiment as shown in FIG. 16, the thickness t41b along the second direction (e.g., the X-axis direction) of at least a portion of the second portion 41b decreases as the distance from the first portion 41a increases. In the magnetic head 124 as well, efficient heat dissipation is obtained. A good side shield effect is obtained.

Figure 17:
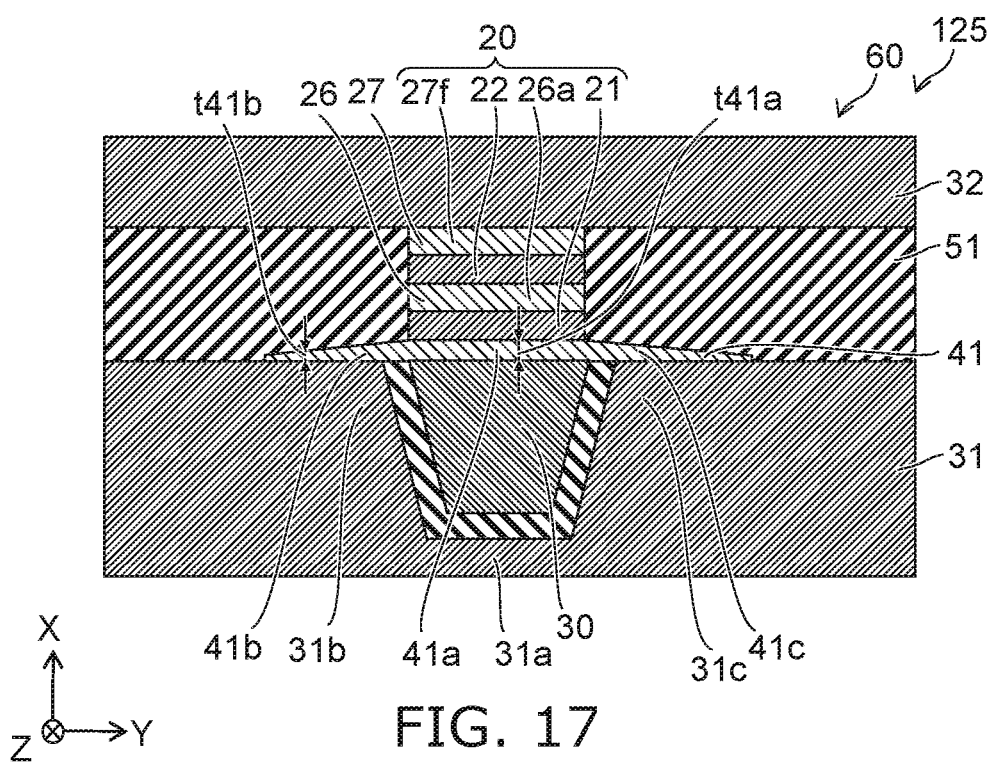
FIG. 17 is a schematic plan view illustrating a magnetic head according to the second embodiment.

FIG. 17 is a schematic plan view illustrating a magnetic head according to the second embodiment.

In the magnetic head 125 according to the embodiment as shown in FIG. 17, the second portion 41b is provided between the second shield 32 and a portion of the second partial region 31b. The thickness t41b decreases as the distance from the first portion 41a increases. In the magnetic head 125 as well, efficient heat dissipation is obtained. A good side shield effect is obtained.

Figure 18:
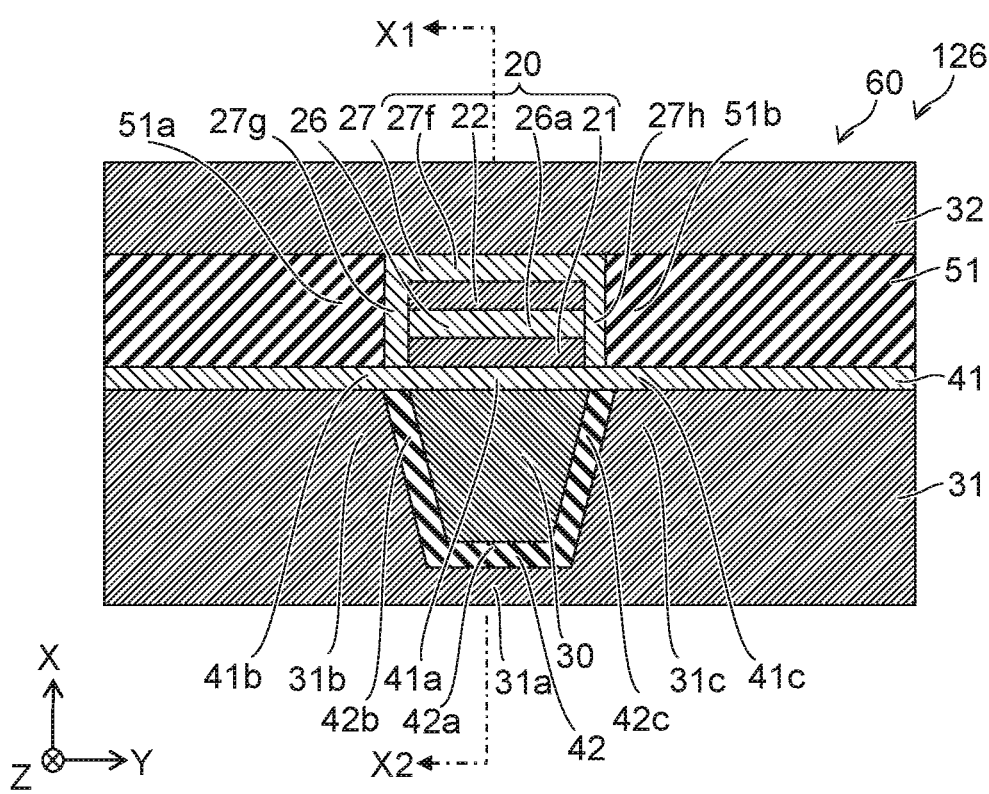
FIG. 18 is a schematic view illustrating a magnetic head according to the second embodiment.
Figure 19:
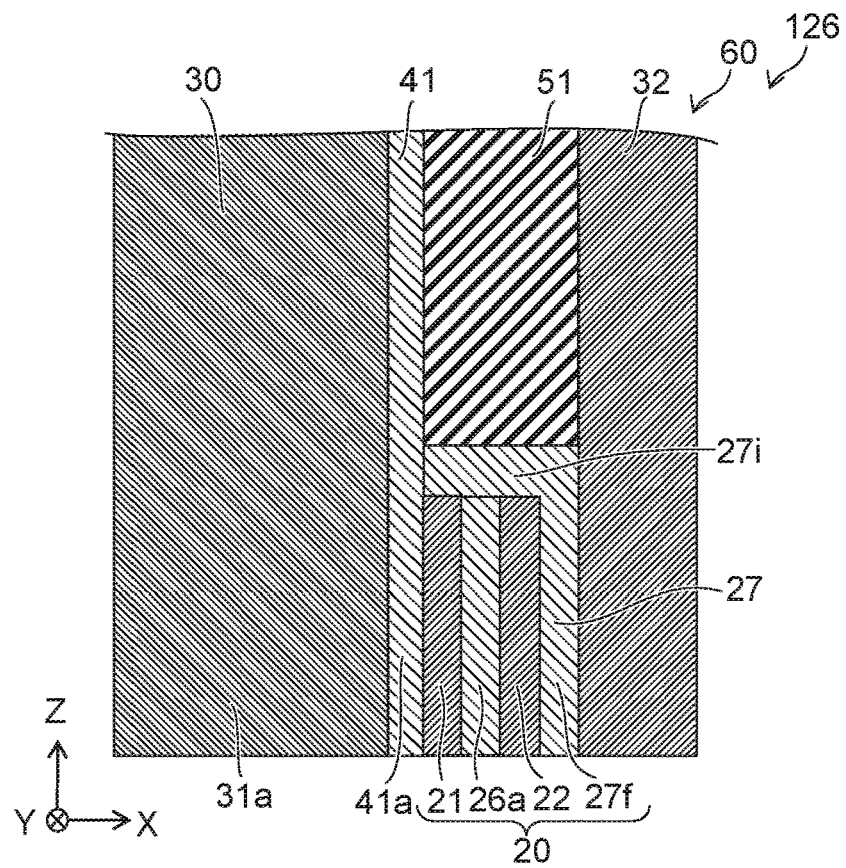
FIG. 19 is a schematic view illustrating the magnetic head according to the second embodiment.

FIGS. 18 and 19 are schematic views illustrating a magnetic head according to the second embodiment.

FIG. 18 is a plan view. FIG. 19 is a line X1-X2 cross-sectional view of FIG. 18.

In the magnetic head 126 according to the embodiment as shown in FIG. 18, the second nonmagnetic layer 27 includes a seventh nonmagnetic region 27g and an eighth nonmagnetic region 27h. For example, the seventh nonmagnetic region 27g and the eighth nonmagnetic region 27h are continuous with the sixth nonmagnetic region 27f. The second magnetic layer 22 is between the seventh nonmagnetic region 27g and the eighth nonmagnetic region 27h in the first direction (the Y-axis direction). In the example, the first magnetic layer 21 is between the seventh nonmagnetic region 27g and the eighth nonmagnetic region 27h. For example, spin is injected from the seventh nonmagnetic region 27g into the side surface of the second magnetic layer 22. Spin is injected from the eighth nonmagnetic region 27h into the side surface of the second magnetic layer 22. For example, the reversal of the magnetization of the second magnetic layer 22 is efficiently performed. For example, the voltage for supplying the current to the second magnetic layer 22 can be reduced. For example, spin is injected from the seventh nonmagnetic region 27g into the side surface of the first magnetic layer 21. Spin is injected from the eighth nonmagnetic region 27h into the side surface of the first magnetic layer 21. For example, the reversal of the magnetization of the first magnetic layer 21 is efficiently performed. For example, the voltage for supplying the current to the first magnetic layer 21 can be reduced.

As shown in FIG. 19, the second nonmagnetic layer 27 may include a ninth nonmagnetic region 27i. For example, the ninth nonmagnetic region 27i is continuous with the sixth nonmagnetic region 27f. The third direction from the second magnetic layer 22 toward the ninth nonmagnetic region 27i crosses a plane including the first and second directions. The third direction is, for example, the Z-axis direction. Spin is injected from the ninth nonmagnetic region 27i into the side surface of the second magnetic layer 22. The reversal of the magnetization of the second magnetic layer 22 is efficiently performed. For example, the voltage for supplying the current to the second magnetic layer 22 can be reduced. For example, spin is injected from the ninth nonmagnetic region 27i into the side surface of the first magnetic layer 21. The reversal of the magnetization of the first magnetic layer 21 is efficiently performed. For example, the voltage for supplying the current to the first magnetic layer 21 can be reduced.

An example of the magnetic head and the magnetic recording medium according to the embodiment will now be described.

Figure 20:
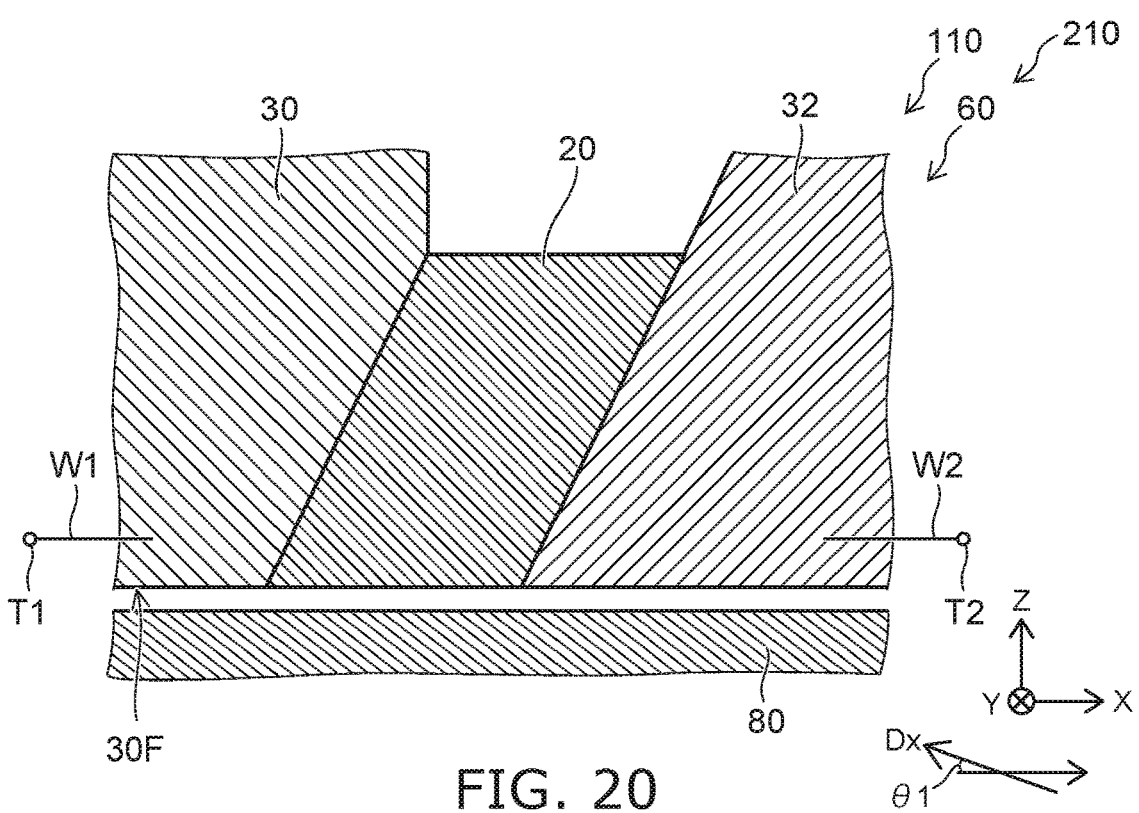
FIG. 20 is a schematic cross-sectional view illustrating the magnetic head according to the embodiment.

FIG. 20 is a schematic cross-sectional view illustrating the magnetic head according to the embodiment.

The first nonmagnetic member 41 is not illustrated in FIG. 20. In the magnetic head (e.g., the magnetic head 110) according to the embodiment as shown in FIG. 20, a direction Dx from the second shield 32 toward the magnetic pole 30 may be tilted with respect to the X-axis direction. The direction Dx corresponds to the stacking direction of the stacked body 20. The X-axis direction is along the medium-facing surface 30F of the magnetic pole 30. The angle between the direction Dx and the medium-facing surface 30F is taken as an angle θ1. The angle θ1 is, for example, not less than 15 degrees and not more than 30 degrees. The angle θ1 may be 0 degrees.

When the direction Dx is tilted with respect to the X-axis direction, the thicknesses of the layers correspond to lengths along the direction Dx. The configuration in which the direction Dx is tilted with respect to the X-axis direction is applicable to any magnetic head according to the first or second embodiment.

An example of the magnetic head and the magnetic recording medium according to the embodiment will now be described. An example of the magnetic head 110 will be described.

Figure 21:
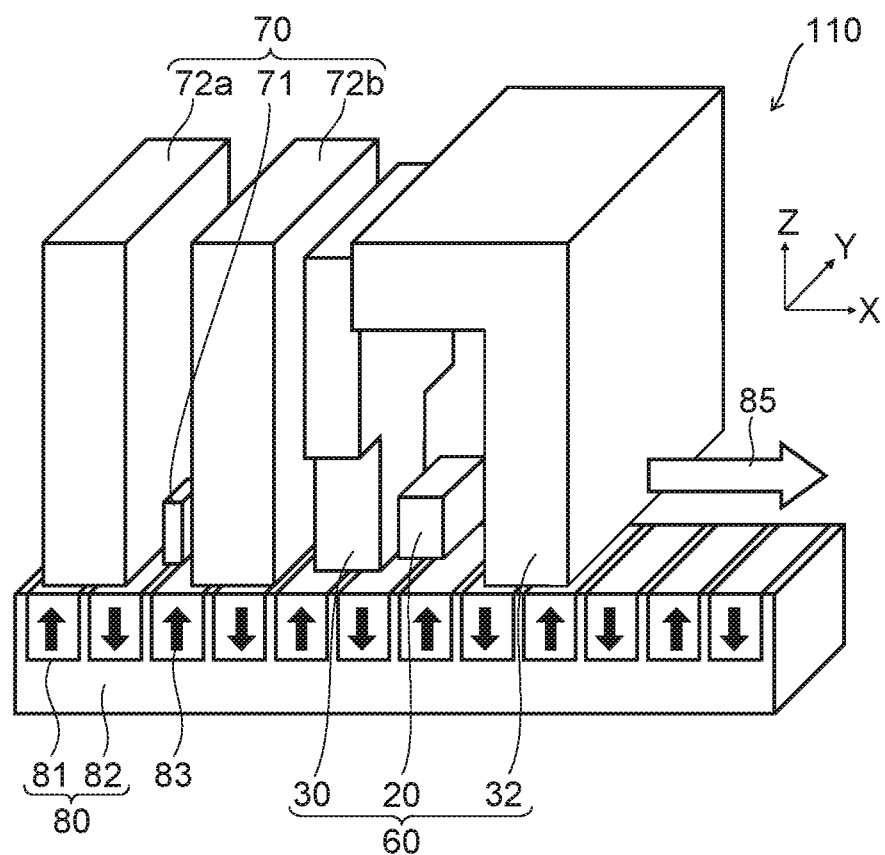
FIG. 21 is a schematic perspective view illustrating the magnetic recording device according to the embodiment.

FIG. 21 is a schematic perspective view illustrating the magnetic recording device according to the embodiment.

Figure 22:
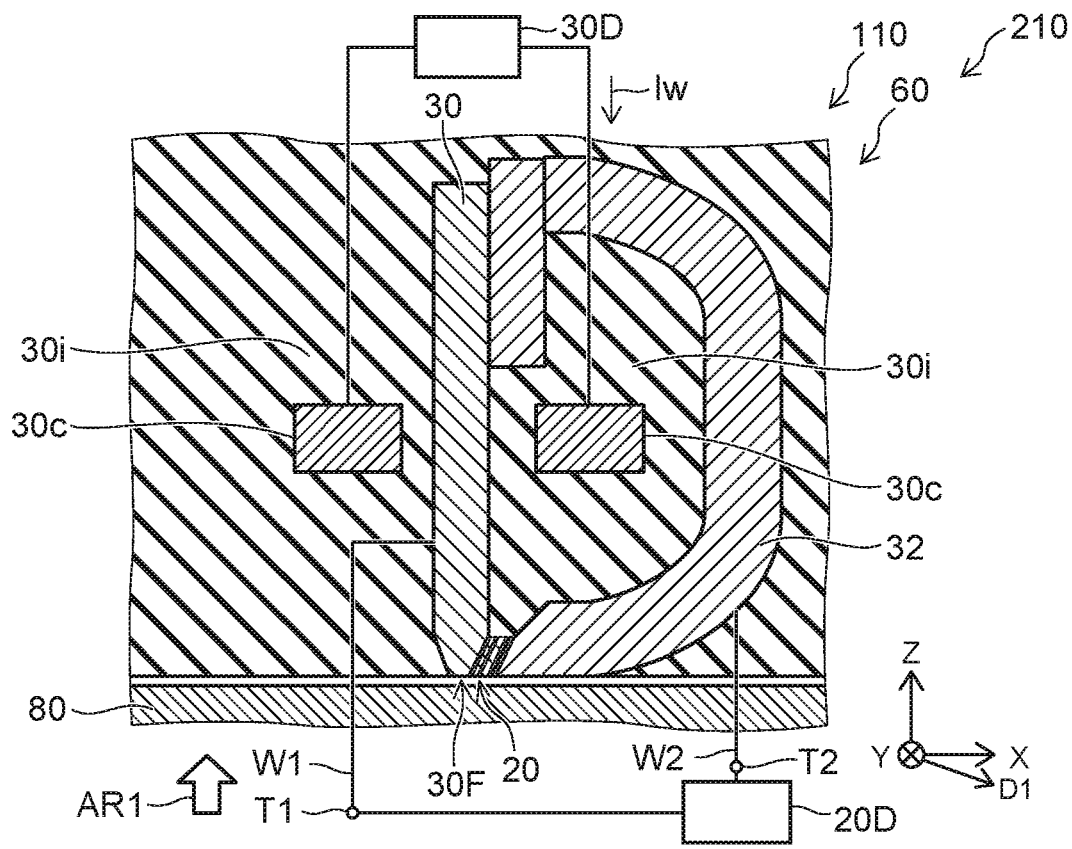
FIG. 22 is a schematic cross-sectional view illustrating the magnetic head according to the embodiment.

FIG. 22 is a schematic cross-sectional view illustrating the magnetic head according to the embodiment. The first shield 31 and the first nonmagnetic member 41 are not illustrated in these drawings.

As shown in FIG. 21, the magnetic head 110 according to the embodiment is used with the magnetic recording medium 80. The magnetic recording device 210 according to the embodiment includes the magnetic head 110 and the magnetic recording medium 80. In the example, the magnetic head 110 includes the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproduction magnetic shield 72a, a second reproduction magnetic shield 72b, and a magnetic reproducing element 71. The magnetic reproducing element 71 is provided between the first reproduction magnetic shield 72a and the second reproduction magnetic shield 72b. The magnetic reproducing element 71 can output a signal corresponding to the magnetization 83 of the magnetic recording layer 81.

As shown in FIG. 21, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

As shown in FIG. 22, a coil 30c is provided at the magnetic head 110. A recording current Iw is supplied from a recording circuit 30D to the coil 30c. A recording magnetic field that corresponds to the recording current Iw is applied from the magnetic pole 30 to the magnetic recording medium 80.

As shown in FIG. 22, the magnetic pole 30 includes the medium-facing surface 30F. A direction perpendicular to the medium-facing surface 30F corresponds to the Z-axis direction.

As shown in FIG. 22, an electrical circuit 20D is electrically connected to the stacked body 20. In the example, the stacked body 20 is electrically connected to the first shield 31 (not illustrated in FIG. 22) and the second shield 32. A first terminal T1 and a second terminal T2 are provided in the magnetic head 110. The first terminal T1 is electrically connected to the stacked body 20 via first wiring W1 and the first shield 31. The second terminal T2 is electrically connected to the stacked body 20 via second wiring W2 and the second shield 32. For example, a current (e.g., a direct current) is supplied from the electrical circuit 20D to the stacked body 20.

As shown in FIG. 22, an insulating portion 30i is provided around the magnetic pole 30 and the second shield 32.

The magnetic recording device 210 according to the embodiment includes the magnetic head 110, and the magnetic recording medium 80 in which the information is recorded by the magnetic head 110. An example of the magnetic recording device according to the embodiment will now be described. The magnetic recording device may be a magnetic recording and reproducing device. The magnetic head may include a recording part and a reproducing part.

Figure 23:
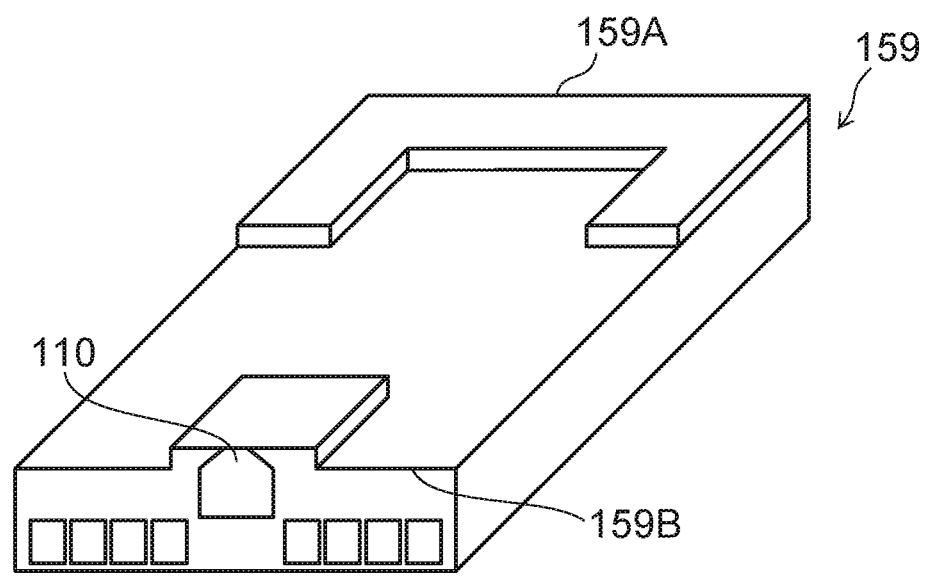
FIG. 23 is a schematic perspective view illustrating a portion of the magnetic recording device according to the embodiment.

FIG. 23 is a schematic perspective view illustrating a portion of the magnetic recording device according to the embodiment.

FIG. 23 illustrates a head slider.

The magnetic head 110 is provided in the head slider 159. The head slider 159 includes, for example, Al₂O₃/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 24:
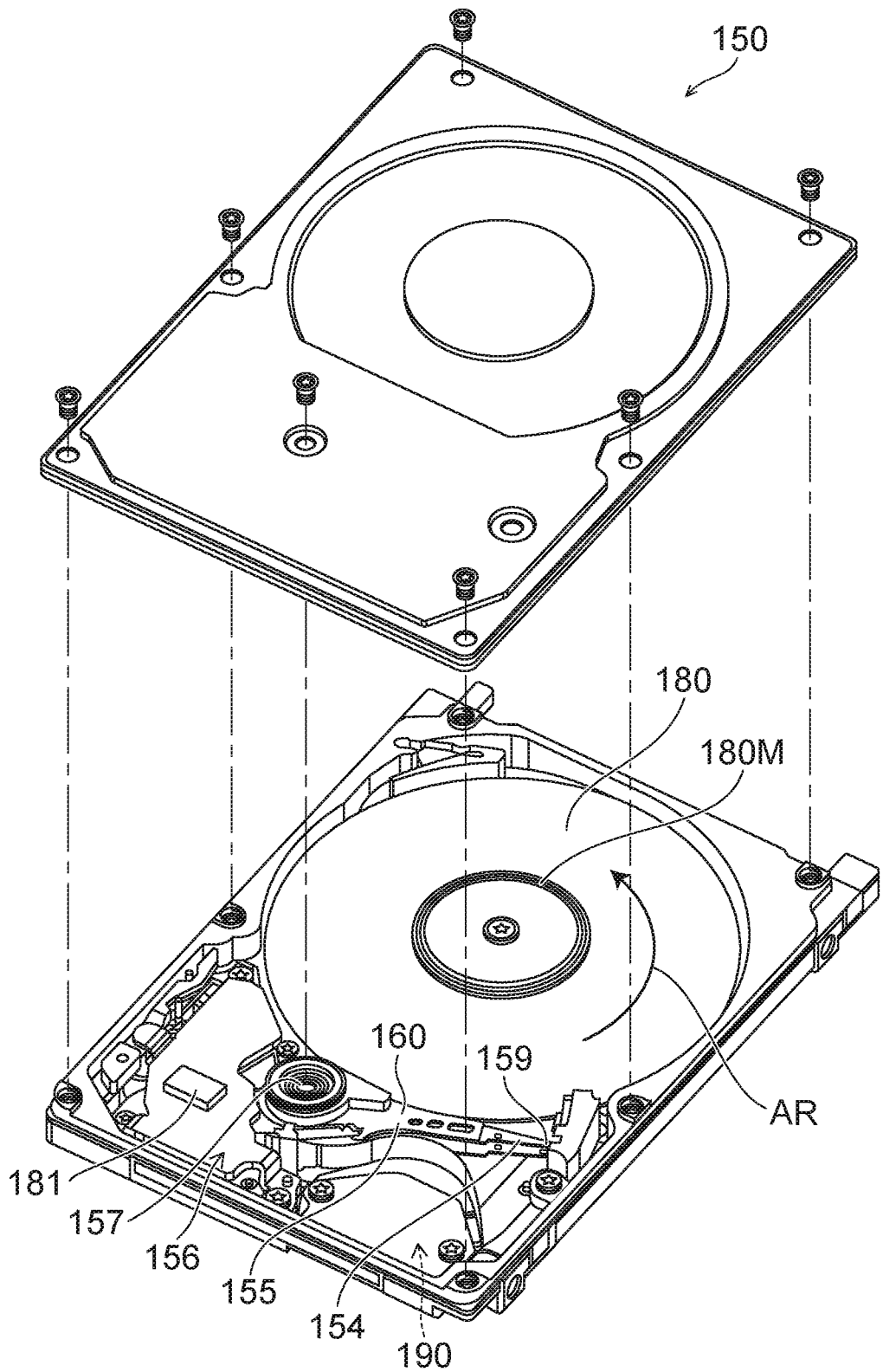
FIG. 24 is a schematic perspective view illustrating the magnetic recording device according to the embodiment.

FIG. 24 is a schematic perspective view illustrating the magnetic recording device according to the embodiment.

Figure 25A:
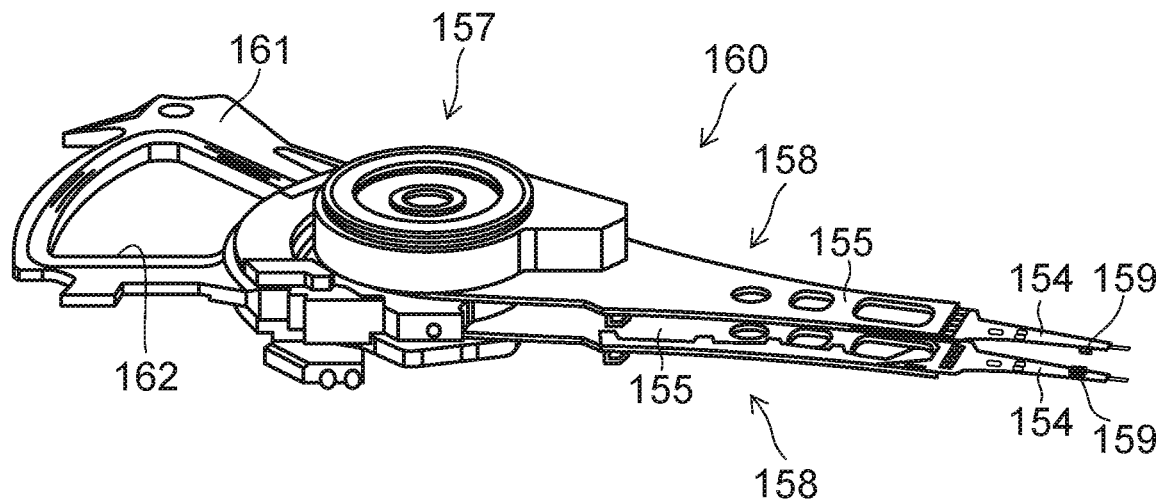
FIGS. 25A and 25B are schematic perspective views illustrating a portion of the magnetic recording device according to the embodiment.
Figure 25B:
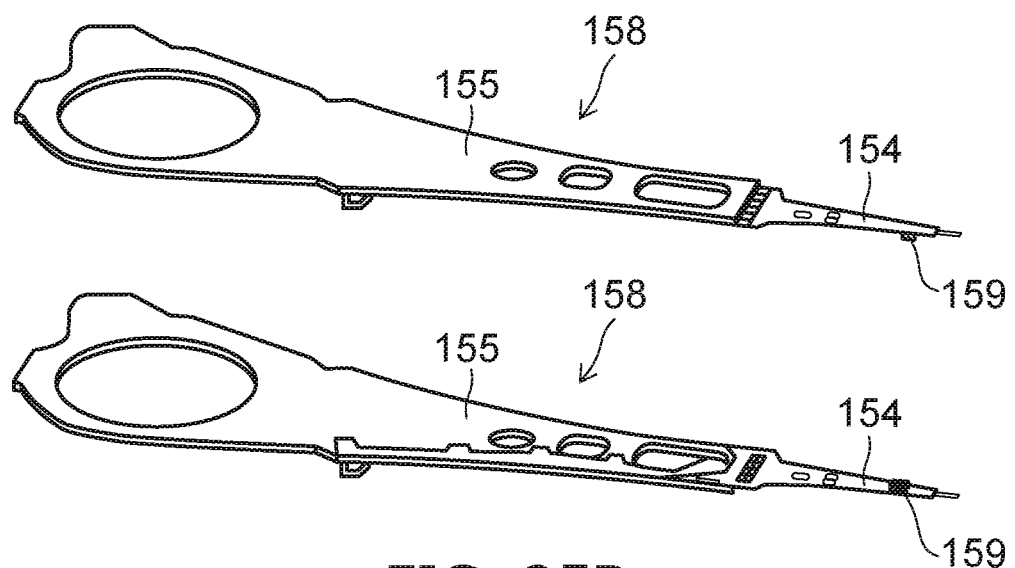

FIGS. 25A and 25B are schematic perspective views illustrating a portion of the magnetic recording device according to the embodiment.

As shown in FIG. 24, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 25A illustrates the configuration of a portion of the magnetic recording device and is an enlarged perspective view of a head stack assembly 160.

FIG. 25B is a perspective view illustrating a magnetic head assembly (a head gimbal assembly (HGA)) 158 that is a portion of the head stack assembly 160.

As shown in FIG. 25A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 25B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin-transfer torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

The embodiments include, for example, the following configurations (e.g., technological proposals).

Configuration 1

A magnetic head, comprising:

a first shield including a first partial region, a second partial region, and a third partial region, a direction from the second partial region toward the third partial region being along a first direction, a position of the first partial region in the first direction being between a position of the second partial region in the first direction and a position of the third partial region in the first direction;

a second shield, a second direction from the first shield toward the second shield crossing the first direction;

a magnetic pole provided between the first partial region and the second shield in the second direction, the magnetic pole being between the second partial region and the third partial region in the first direction;

a first magnetic layer provided between the magnetic pole and the second shield; and a first nonmagnetic member including a first portion and a second portion, the first portion being between the magnetic pole and the first magnetic layer in the second direction, the second portion being between the second partial region and the second shield in the second direction, the second portion being electrically connected to the second partial region.

Configuration 2

The magnetic head according to Configuration 1, wherein the first nonmagnetic member further includes a third portion, and the third portion is between the third partial region and the second shield in the second direction and is electrically connected to the third partial region.

Configuration 3

The magnetic head according to Configuration 2, further comprising:

a first insulating member including a first insulating region and a second insulating region, the first insulating region being between the second portion and the second shield in the second direction, the second insulating region being between the third portion and the second shield in the second direction, the first magnetic layer being between the first insulating region and the second insulating region in the first direction.

Configuration 4
The magnetic head according to any one of Configurations 1 to 3, wherein
the second partial region contacts the second portion.
Configuration 5
The magnetic head according to any one of Configurations 1 to 4, wherein
the magnetic pole includes a first surface facing the first portion,
the second partial region includes a second surface facing the second portion, and
a direction from the second surface toward the first surface is along the first direction.
Configuration 6
The magnetic head according to any one of Configurations 1 to 4, wherein
the magnetic pole includes a first surface facing the first portion,
the second partial region includes a second surface facing the second portion, and
a position in the second direction of the second surface is substantially the same as a position in the second direction of the first surface.
Configuration 7
The magnetic head according to any one of Configurations 1 to 6, wherein
a thickness along the second direction of the first portion is greater than a thickness along the second direction of the second portion.
Configuration 8
The magnetic head according to any one of Configurations 1 to 6, wherein
a thickness along the second direction of at least a portion of the second portion decreases as a distance from the first portion increases.
Configuration 9
The magnetic head according to any one of Configurations 1 to 8, further comprising:
a second nonmagnetic member,
the second nonmagnetic member including a first nonmagnetic portion, a second nonmagnetic portion, and a third nonmagnetic portion,
the first nonmagnetic portion being between the first partial region and the magnetic pole in the second direction,
the second nonmagnetic portion being between the second partial region and the magnetic pole in the first direction,
the third nonmagnetic portion being between the magnetic pole and the third partial region in the first direction.
Configuration 10
The magnetic head according to any one of Configurations 1 to 9, wherein
the first nonmagnetic member includes at least one selected from the group consisting of Cr, Ru, Ta, Pt, Mn, Ir, and W.
Configuration 11
The magnetic head according to any one of Configurations 1 to 10, wherein
the first magnetic layer includes a first element, and
the first element includes at least one selected from the group consisting of Fe, Co, and Ni.
Configuration 12
The magnetic head according to Configuration 11, wherein
the first magnetic layer further includes a second element, and
the second element includes at least one selected from the group consisting of B, Cr, N, and Si.
Configuration 13
The magnetic head according to any one of Configurations 1 to 12, further comprising:
a first nonmagnetic layer including a first nonmagnetic region,
the first nonmagnetic region being between the first magnetic layer and the second shield in the second direction.
Configuration 14
The magnetic head according to Configuration 13, wherein
the first nonmagnetic layer includes at least one selected from the group consisting of Cu, Ag, Au, Al, Cr, and Ru.
Configuration 15
The magnetic head according to Configuration 13 or 14, wherein
the first nonmagnetic layer further includes a second nonmagnetic region and a third nonmagnetic region,
the second nonmagnetic region and the third nonmagnetic region are continuous with the first nonmagnetic region, and
the first magnetic layer is between the second nonmagnetic region and the third nonmagnetic region in the first direction.
Configuration 16
The magnetic head according to any one of Configurations 13 to 15, wherein
the first nonmagnetic layer further includes a fourth nonmagnetic region continuous with the first nonmagnetic region, and
a third direction from the first magnetic layer toward the fourth nonmagnetic region crosses a plane including the first and second directions.
Configuration 17
The magnetic head according to any one of Configurations 1 to 8, further comprising:
a second magnetic layer;
a first nonmagnetic layer; and
a second nonmagnetic layer,
the first nonmagnetic layer including a first nonmagnetic region,
the first nonmagnetic region being between the first magnetic layer and the second shield in the second direction,
the second magnetic layer being between the first nonmagnetic region and the second shield in the second direction,
the second nonmagnetic layer including a sixth nonmagnetic region,
the sixth nonmagnetic region being between the second magnetic layer and the second shield in the second direction.
Configuration 18
The magnetic head according to Configuration 17, wherein
the second magnetic layer includes a third element, and
the third element includes at least one selected from the group consisting of Fe, Co, and Ni.
Configuration 19
The magnetic head according to Configuration 18, wherein
the second magnetic layer further includes a fourth element, and
the fourth element includes at least one selected from the group consisting of B, Cr, N, and Si.
Configuration 20
The magnetic head according to any one of Configurations 17 to 19, wherein
the first nonmagnetic layer includes at least one selected from the group consisting of Cu, Ag, Au, Al, Cr, and Ru, and the second nonmagnetic layer includes at least one selected from the group consisting of Cu, Ag, Au, Al, Cr, Ru, Ta, Pt, Mn, Ir, and W.

Configuration 21

The magnetic head according to any one of Configurations 17 to 20, wherein the second nonmagnetic layer further includes a seventh nonmagnetic region and an eighth nonmagnetic region, the seventh nonmagnetic region and the eighth nonmagnetic region are continuous with the sixth nonmagnetic region, and the second magnetic layer is between the seventh nonmagnetic region and the eighth nonmagnetic region in the first direction.

Configuration 22

The magnetic head according to any one of Configurations 17 to 21, wherein the second nonmagnetic layer further includes a ninth nonmagnetic region continuous with the sixth nonmagnetic region, and a third direction from the second magnetic layer toward the ninth nonmagnetic region crosses a plane including the first and second directions.

According to the embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as first shields, second shields, magnetic poles, nonmagnetic members, stacked bodies, magnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a first shield including a first partial region, a second partial region, and a third partial region, a direction from the second partial region toward the third partial region being along a first direction, a position of the first partial region in the first direction being between a position of the second partial region in the first direction and a position of the third partial region in the first direction;
a second shield, a second direction from the first shield toward the second shield crossing the first direction;
a magnetic pole provided between the first partial region and the second shield in the second direction, the magnetic pole being between the second partial region and the third partial region in the first direction;
a first magnetic layer provided between the magnetic pole and the second shield; and
a first nonmagnetic member including a first portion and a second portion, the first portion being between the magnetic pole and the first magnetic layer in the second direction, the second portion being between the second partial region and the second shield in the second direction, the second portion being electrically connected to the second partial region.

2. The head according to claim 1, wherein
the first nonmagnetic member further includes a third portion, and
the third portion is between the third partial region and the second shield in the second direction and is electrically connected to the third partial region.

3. The head according to claim 2, further comprising:
a first insulating member including a first insulating region and a second insulating region,
the first insulating region being between the second portion and the second shield in the second direction,
the second insulating region being between the third portion and the second shield in the second direction,
the first magnetic layer being between the first insulating region and the second insulating region in the first direction.

4. The head according to claim 1, wherein
the second partial region contacts the second portion.

5. The head according to claim 1, wherein
the magnetic pole includes a first surface facing the first portion,
the second partial region includes a second surface facing the second portion, and
a direction from the second surface toward the first surface is along the first direction.

6. The head according to claim 1, wherein
the magnetic pole includes a first surface facing the first portion,
the second partial region includes a second surface facing the second portion, and
a position in the second direction of the second surface is substantially the same as a position in the second direction of the first surface.

7. The head according to claim 1, wherein
a thickness along the second direction of the first portion is greater than a thickness along the second direction of the second portion.

8. The head according to claim 1, wherein a thickness along the second direction of at least a portion of the second portion decreases as a distance from the first portion increases.

9. The head according to claim 1, further comprising: a second nonmagnetic member,
the second nonmagnetic member including a first nonmagnetic portion, a second nonmagnetic portion, and a third nonmagnetic portion,
the first nonmagnetic portion being between the first partial region and the magnetic pole in the second direction,
the second nonmagnetic portion being between the second partial region and the magnetic pole in the first direction,
the third nonmagnetic portion being between the magnetic pole and the third partial region in the first direction.

10. The head according to claim 1, wherein the first nonmagnetic member includes at least one selected from the group consisting of Cr, Ru, Ta, Pt, Mn, Ir, and W.

11. The head according to claim 1, wherein the first magnetic layer includes a first element, and the first element includes at least one selected from the group consisting of Fe, Co, and Ni.

12. The head according to claim 11, wherein the first magnetic layer further includes a second element, and
the second element includes at least one selected from the group consisting of B, Cr, N, and Si.

13. The head according to claim 1, further comprising: a first nonmagnetic layer including a first nonmagnetic region,
the first nonmagnetic region being between the first magnetic layer and the second shield in the second direction.

14. The head according to claim 13, wherein the first nonmagnetic layer includes at least one selected from the group consisting of Cu, Ag, Au, Al, Cr, and Ru.

15. The head according to claim 13, wherein the first nonmagnetic layer further includes a second nonmagnetic region and a third nonmagnetic region,
the second nonmagnetic region and the third nonmagnetic region are continuous with the first nonmagnetic region, and
the first magnetic layer is between the second nonmagnetic region and the third nonmagnetic region in the first direction.

16. The head according to claim 13, wherein the first nonmagnetic layer further includes a fourth nonmagnetic region continuous with the first nonmagnetic region, and
a third direction from the first magnetic layer toward the fourth nonmagnetic region crosses a plane including the first and second directions.

17. The head according to claim 1, further comprising:
a second magnetic layer;
a first nonmagnetic layer; and
a second nonmagnetic layer,
the first nonmagnetic layer including a first nonmagnetic region,
the first nonmagnetic region being between the first magnetic layer and the second shield in the second direction,
the second magnetic layer being between the first nonmagnetic region and the second shield in the second direction,
the second nonmagnetic layer including a sixth nonmagnetic region,
the sixth nonmagnetic region being between the second magnetic layer and the second shield in the second direction.

18. The head according to claim 17, wherein the second magnetic layer includes a third element, and the third element includes at least one selected from the group consisting of Fe, Co, and Ni.

19. The head according to claim 18, wherein the second magnetic layer further includes a fourth element, and
the fourth element includes at least one selected from the group consisting of B, Cr, N, and Si.

20. The head according to claim 17, wherein the first nonmagnetic layer includes at least one selected from the group consisting of Cu, Ag, Au, Al, Cr, and Ru, and
the second nonmagnetic layer includes at least one selected from the group consisting of Cu, Ag, Au, Al, Cr, Ru, Ta, Pt, Mn, Ir, and W.

* * * * *